United States Patent Office 2,951,343
Patented Sept. 6, 1960

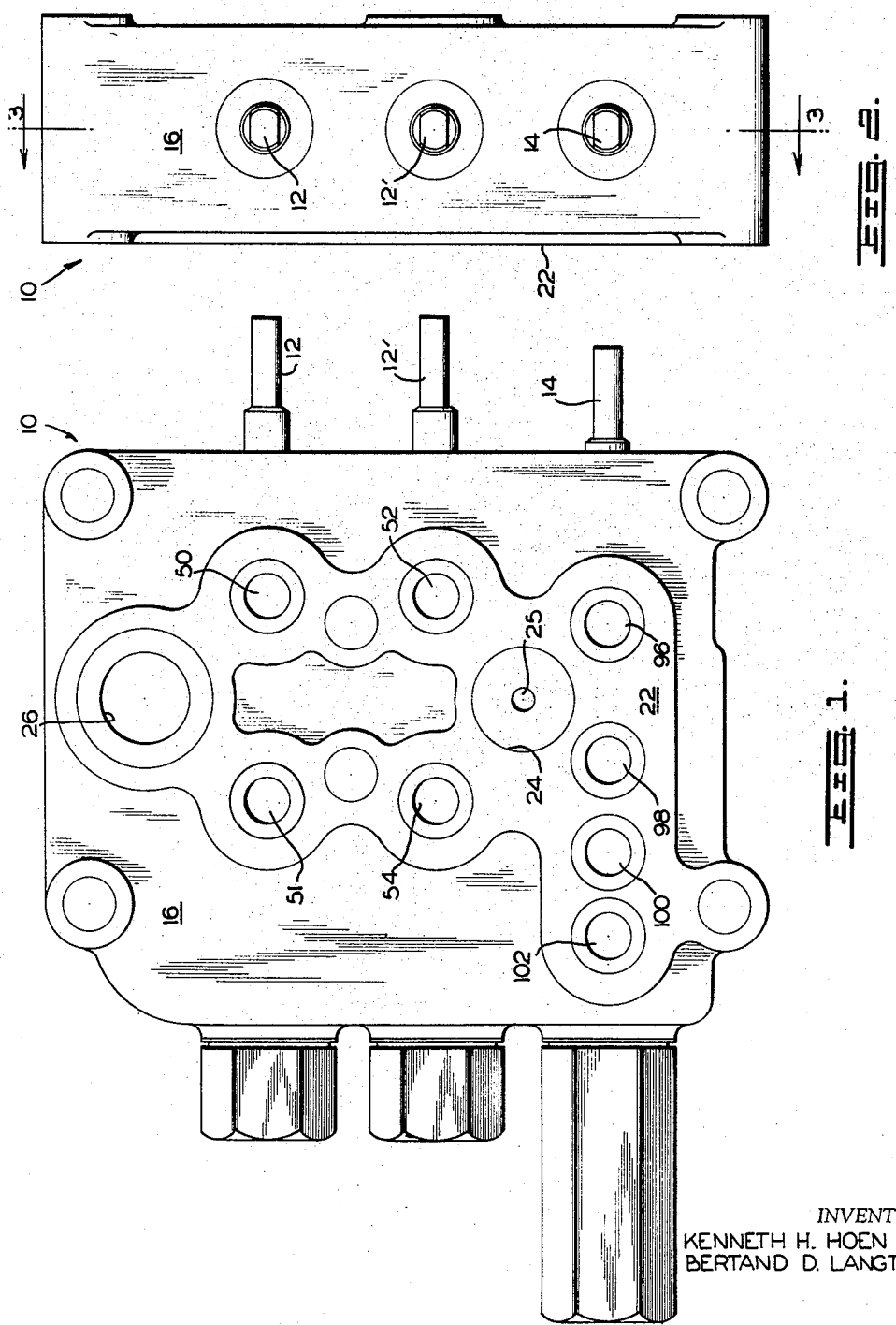

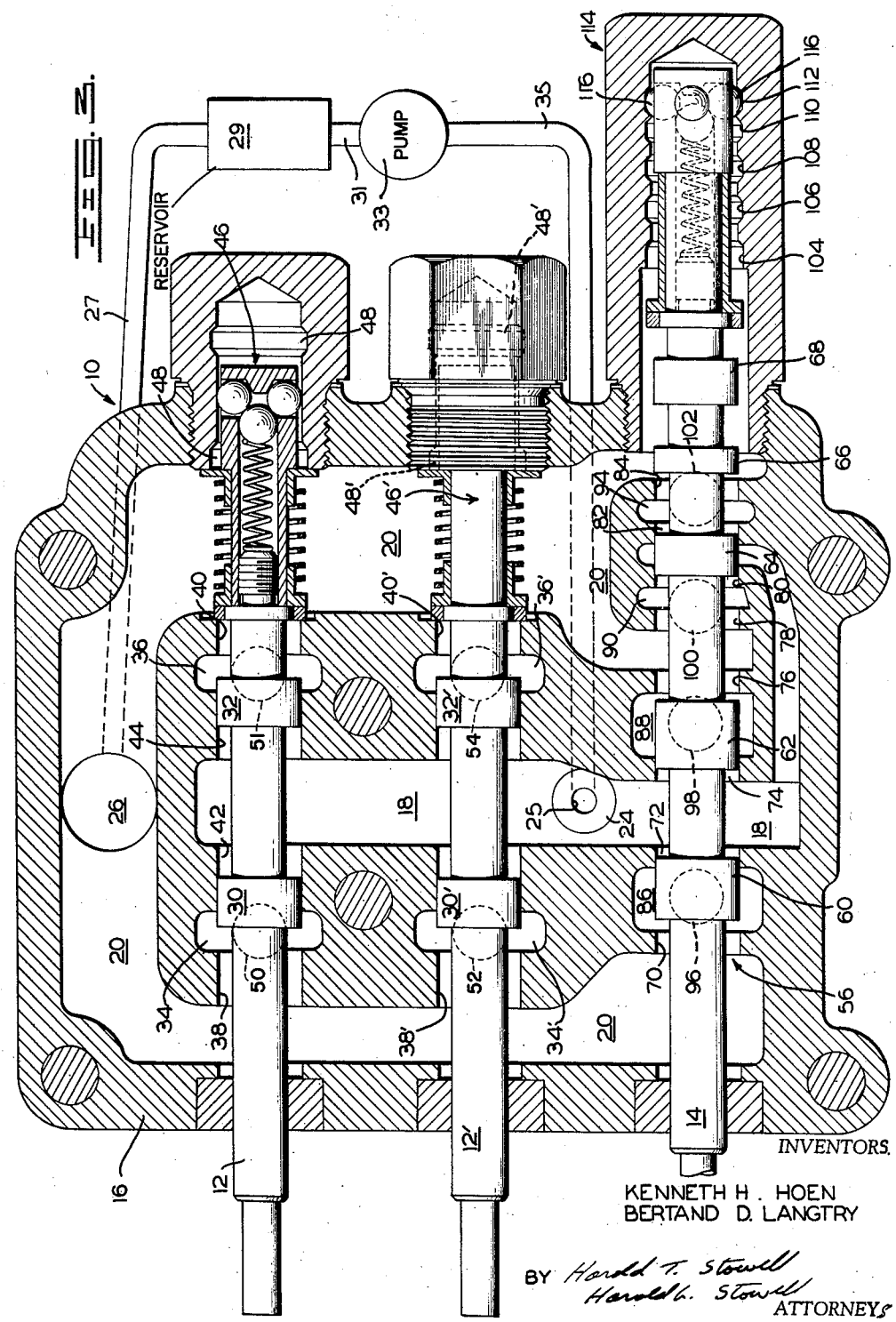

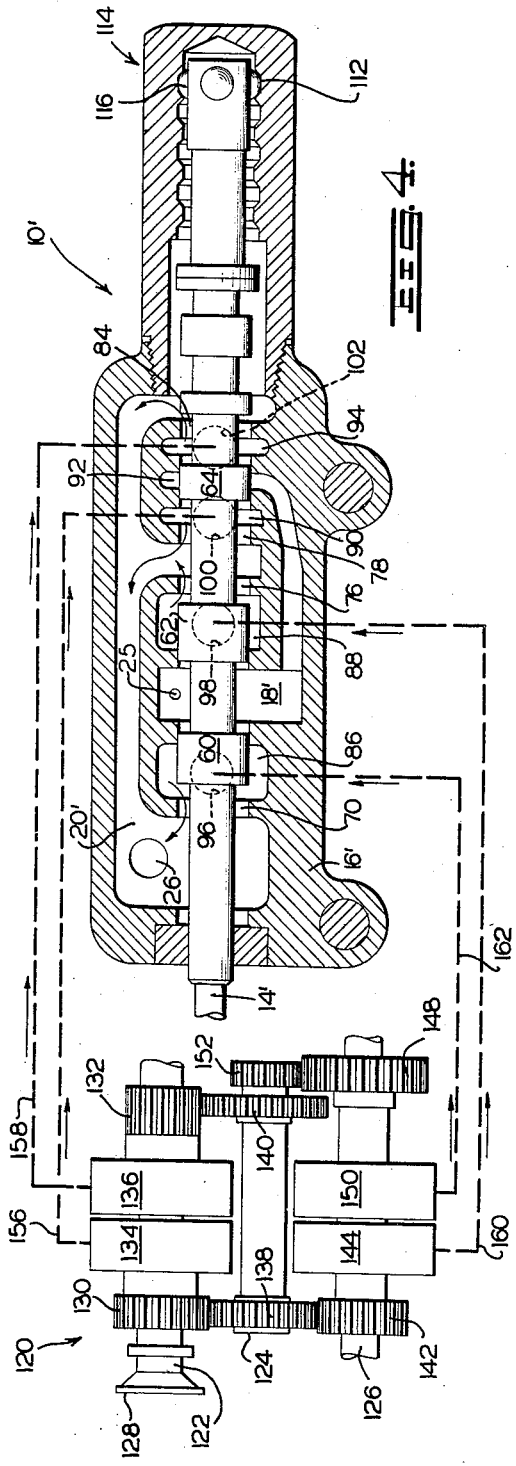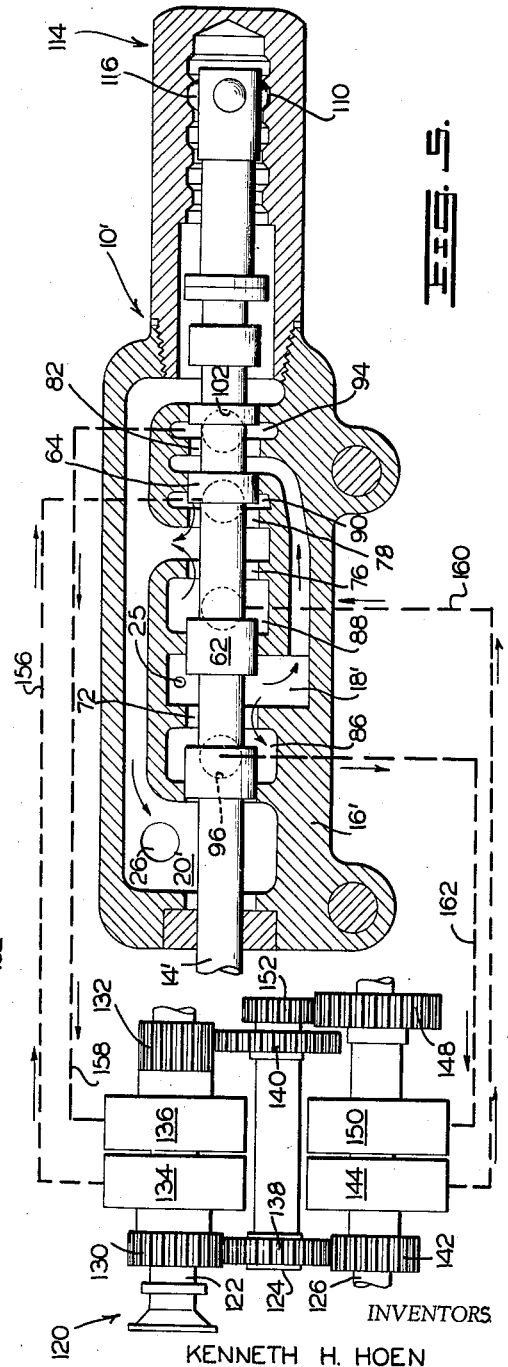

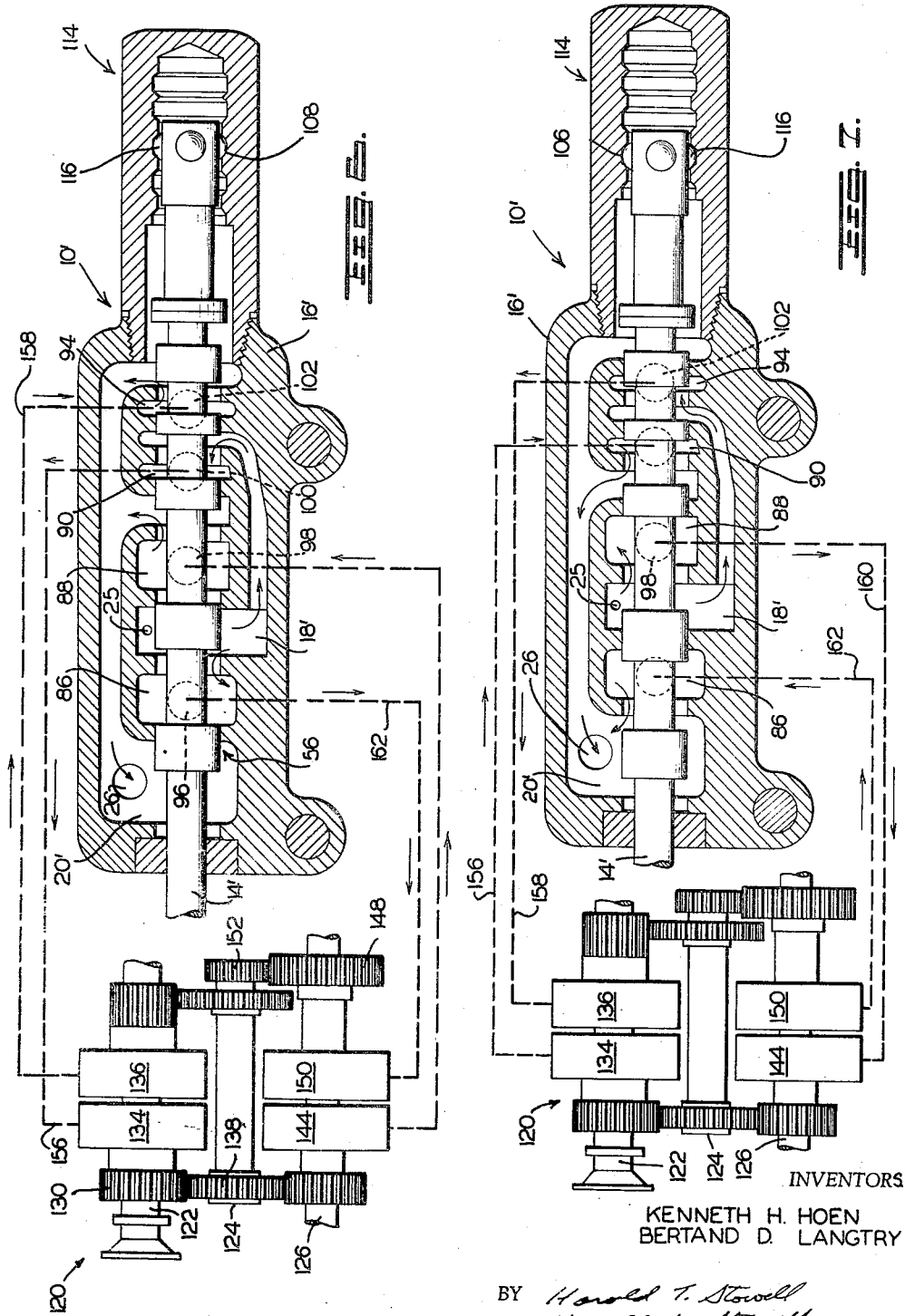

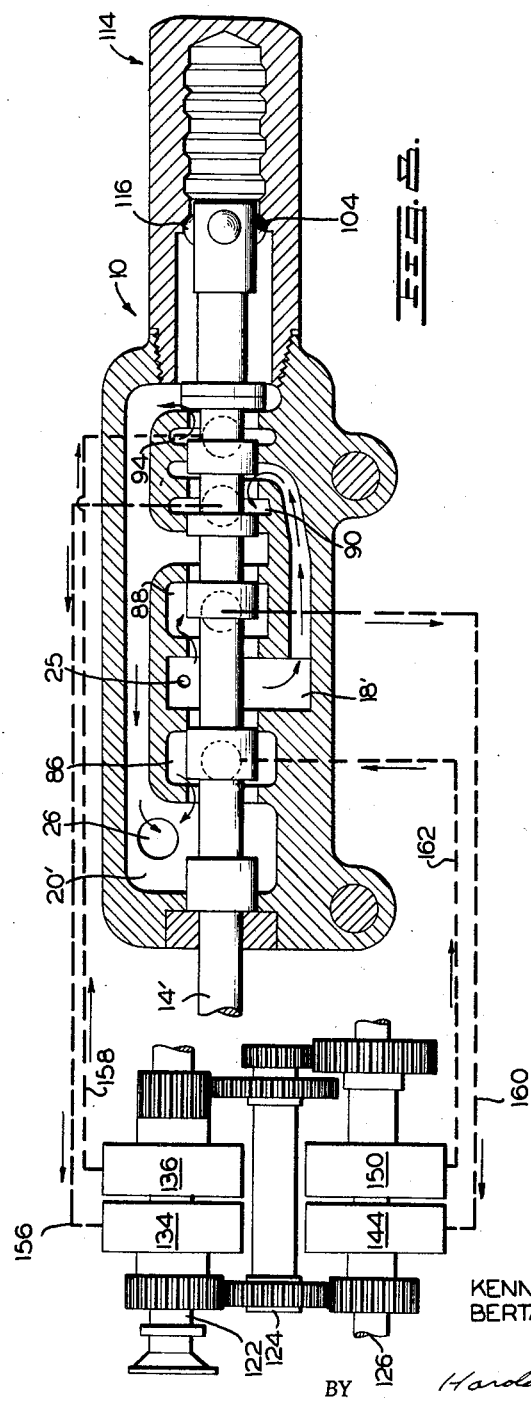

2,951,343

PRESSURE FLUID CONTROL SYSTEM

Kenneth H. Hoen and Bertand D. Langtry, Salt Lake City, Utah, assignors to The Eimco Corporation, Salt Lake City, Utah, a corporation of Delaware Filed Apr. 20, 1959, Ser. No. 807,698

4 Claims. (Cl. 60—97)

This invention relates to improvements in pressure fluid control systems and, more particularly, to such systems having valve means provided with a flow control spool shiftable from a neutral position serially through plural control positions for controlling the flow of fluid to and from plural pressure fluid actuated motion devices.

It is an object of the invention to provide such a system wherein plural motion devices may be actuated and deactuated in preselected combinations of pairs of the motion devices.

It is a further object to provide such a system wherein the control valve spool may be shifted quickly from one control setting to another without actuating motion devices coupled to the valve at intermediate spool settings.

A further object is to provide an improved pressure fluid control system wherein plural pressure fluid actuatable motion devices are selectively actuated in pairs while the other of the motion devices are deactuated.

A further object is to provide such a system including a valve member having one shiftable control spool.

Another object is to provide with the said valve detent means for holding the valve spool in selected control positions.

The system of the present invention generally comprises a plurality of pressure fluid actuated motion devices, a control valve, pressure fluid conduit means connecting a source of pressure fluid with the control valve, exhaust conduit means connecting the control valve with sump means for the pressure fluid, and a line connecting each of the plurality of motion devices with the control valve, wherein the control valve includes a body portion having a bore therein, a groove in the valve body bore for each motion device communicating through a port in the valve body with the respective line for each motion device, a pressure fluid plenum chamber in the valve body communicating with the pressure fluid conduit means and with each of the valve body grooves, an exhaust fluid plenum chamber in the valve body communicating with the exhaust conduit means and with each of the valve body grooves, a single spool means slidable in the valve body bore, and spaced lands and grooves on the spool means cooperating with the grooves in the valve body bore for opening the flow of pressure fluid from the pressure fluid plenum chamber to selected pairs of grooves while maintaining the flow of exhaust pressure fluid between the other grooves and the exhaust plenum chamber and for selectively blocking the flow of pressure fluid from the pressure fluid plenum chamber to the valve body grooves and opening communication between the valve body grooves and the exhaust plenum chamber.

Further objects and advantages of the present invention will appear from the following description and appended claims when read in conjunction with the attached drawings wherein:

Fig. 1 is a view of a control valve of the pressure fluid control system showing a manifold surface for the various pressure fluid and exhaust conduits;

Fig. 2 is an end view of the valve of Fig. 1 from which the spools of the valve project for manual operation;

Fig. 3 is a cutaway and sectional view on line 3—3 of Fig. 2;

Fig. 4 is a partial cutaway and sectioned view of a modified valve for the pressure fluid control system of the invention illustrating one position of the control spool of the valve interconnected to clutch means of a constant mesh change speed transmission having four pressure fluid actuated clutches; and Figs. 5 through 8 are views similar to Fig. 4 showing other positions of the control spool and the flow paths of pressure and exhaust fluid between the valve and the clutches of the constant mesh change speed transmission having fluid pressure actuated clutches.

The improved valve 10 of the system shown in Figs. 1 through 3 has three control spools 12, 12' and 14 which are axially shiftable to control positions in valve body 16. Valve body 16 is shown to have a fluid pressure plenum chamber 18 and a relatively extensive exhaust passage system or exhaust plenum chamber 20. Valve body 16, as indicated in Figs. 1 and 2, is also shown to have manifold surface 22 for mounting to fluid line manifold means not shown. Manifold surface 22 is provided with a fluid pressure inlet 24 for fluid pressure plenum chamber 18. Inlet 24 may have a small diameter restrictor 25 therein to throttle inflowing pressure oil to avoid excessively speedy response in actuation of fluid actuated devices to be controlled by spools 12, 12' and 14. Exhaust opening 26 is provided in manifold surface 22 and through valve body 16 to the internal exhaust plenum chamber 20.

Valve spools 12 and 12' are each provided with lands 30, 32, 30' and 32' respectively. These are so positioned on the respective spools 12 and 12' that in the neutral positions shown fluid pressure from chamber 18 is prevented from entering valve passage means or grooves 34, 36, 34' and 36' respectively, each of which, for the neutral settings, are open through bores 38, 40, 38' and 40' to exhaust through chamber 20, outlet 26, conduit 27, sump 29 and line 31 to the inlet port of a conventional pump means 33. Spools 12 and 12' may be axially moved with, for example, land 30 moving to the left, as seen in Fig. 3, out of bore 42 to block exhaust passage 38 and open valve passage 34 to fluid pressure from fluid pressure plenum chamber 18 which is connected to the output side of the pump 33 by conduit 35. At the same time land 32 continues to block fluid flow from chamber 18 through bore 44 to valve groove 36.

When valve spool 12 is moved in the opposite direction, to the right, from the neutral position shown in Fig. 3, land 32 will pass from passage 44 and block valve groove 36 from exhaust by movement of land 32 into passage 40 and open valve groove 36 to fluid pressure flow from fluid pressure chamber 18 through bore 44. Spools 12 and 12' are each provided with a spring-urged ball type detent means 46 and 46' of a conventional nature each of which is provided with plural detent grooves 48 and 48' for maintaining set positions of the respective spools 12 and 12'.

Valve grooves or passages 34, 36 34' and 36' communicate with valve outlet ports 50, 51, 52 and 54, respectively, which ports may be connected by pressure fluid and exhaust conduits to, for example, pressure fluid actuated reversing clutches of a dual output shaft transmission such as disclosed in U.S. patent application Serial No. 497,132 filed March 28, 1955 by Daniel M. Schwartz et al.

Spool 14 of valve 10 is slidably mounted in a bore, generally designated 56, in the valve body 16 and the spool 14 has from left to right flow control lands 60, 62, 64, 66 and 68.

The bore 56 in the valve body 16 for spool means 14 is divided into bore sections 70, 72, 74, 76, 78, 80, 82 and 84 by portions of the exhaust plenum chamber 20; the pressure fluid plenum chamber 18 and by control grooves 86, 88, 90 and 94 formed in the valve body 16.

Each of the valve body control grooves 86, 88, 90 and 94 communicates with a port 96, 98, 100 and 102, respectively. Each of the ports 96, 98, 100 and 102 has connected thereto a pressure fluid and exhaust line which connect the ports 96, 98, 100 and 102 to motion devices to be controlled by operation of the valve spool as to be more fully described with reference to Figs. 4 through 8 of the drawings.

By axially shifting valve spool means 14 in the bore 56 of the valve body 16, lands 60, 62, 64, 66 and 68 cooperate with bore sections 70, 72, 74, 76, 78, 80, 82 and 84 and the exhaust and pressure fluid plenum chambers 20 and 18, respectively, so that each of the ports 96, 98, 100 and 102 may be placed in communication with the exhaust plenum chamber 20 at one time or selected pairs of the ports 96, 98, 100 and 102 may be placed in communication with pressure fluid in the pressure fluid plenum chamber 18 while the other of the ports are placed in communication with the exhaust plenum chamber 20. With the form of construction illustrated in Figs. 1 through 3, the valve spool means 14 has five primary positions which positions correspond with spool control detent grooves 104, 106, 108, 110 and 112 of ball detent means 114 whereby the operator may selectively position the valve spool 14 in any one of the five positions corresponding to the aforementioned grooves 104, 106, 108, 110 and 112 for the spring-urged detent balls 116.

The operation of the control system of the present invention will be illustrated and described with reference to Figs. 4 through 8. In Figs. 4 through 8 the system of the invention is illustrated with reference to a modified control valve generally designated 10'. Control valve 10' differs from the control valve 10 illustrated in Figs. 1 through 3 only in that pressure fluid plenum chamber 18' and the exhaust plenum chamber 20' cooperate with a single spool 14' rather than plural spools as in the form of the invention illustrated in Figs. 1 through 3. Since all of the lands and grooves of the valve spools 14 and 14' and the bore segments, grooves and ports of valve bodies 16 and 16' are identical, the other reference numerals employed in describing Figs. 1 through 3 are employed to designate identical portions of the valve 10' of Figs. 4 through 8.

Referring specifically to Fig. 4, valve 10' is shown connected to pressure fluid actuated clutches of a portion of a constant mesh change speed transmission generally designated 120. The portion of the transmission 120 shown in Fig. 4 includes an input shaft 122, a first intermediate shaft 124 and a second intermediate shaft 126. The input shaft 122 is connected by coupling 128 to a prime mover for rotating the shaft 122. Shaft 122 has rotatably mounted thereon and selectively coupled thereto a high speed gear 130 and a low speed gear 132. Gear 130 is selectively coupled to the shaft 122 by pressure fluid actuated clutch means 134 while low speed gear 132 is selectively coupled to the shaft 122 by pressure fluid actuated clutch means 136. Intermediate shaft 124 has a gear 138 secured thereto which gear is in constant mesh with gear 130 of shaft 122. Shaft 124 also has a gear 140 secured thereto which gear 140 is in constant mesh with the low speed gear 132 of shaft 122. The second intermediate shaft 126 has a gear 142 rotatably mounted thereon and selectively coupled thereto by pressure fluid actuated clutch means 144. The gear 142 is in constant mesh with the fixed gear 138 of intermediate shaft 124.

The second intermediate shaft 126 has rotatably mounted thereon a second gear 148 which gear is selectively coupled to the second intermediate shaft 126 by a pressure fluid actuated clutch means 150. The gear 148 on the second intermediate shaft 126 is in constant mesh with a gear 152 secured to rotate with the first intermediate shaft 124.

Pressure fluid actuated clutch means 134, 136, 144 and 150 can be of conventional design and may be constructed as shown and described in United States patent application Serial No. 803,119 filed March 21, 1959 by Daniel M. Schwartz and Ernest M. Martin, entitled "Dual Pressure Fluid Actuated Clutch Assembly."

Clutch 134 on input shaft 122 is connected by a line 156 to port 100 of valve 10'; pressure fluid actuated clutch means 136 is connected by a conduit means 158 to port 102 of valve 10'; clutch means 144 is connected by conduit means 160 to port 98 of valve 10'; and pressure fluid actuated clutch means 150 is connected by conduit means 162 to port means 96 of valve 10'.

With the valve spool 14' in its most inward position as shown in Fig. 4 with the ball detents 116 engaging detent groove 112 of ball detent means 114, spool lands 60, 62 and 64 prevent pressure fluid in pressure fluid plenum chamber 18' from entering valve bore grooves 86, 88, 90 and 94 and permit communication between each of these valve bore grooves and the exhaust plenum chamber 20' through bore sections 70, 76, 78 and 84, respectively, whereby pressure fluid is vented from each of the clutches 134, 136, 144 and 150 through their respective conduit means 156, 158, 160 and 162 so that no power is transmitted from the input shaft 122 through intermediate shafts 124 and 126.

Referring to Fig. 5 of the drawings, the valve spool 14' of valve 10' is shown moved toward the left so that ball detents 116 of ball detent means 114 engage detent groove 110. With the valve spool 14' in the illustrated position, pressure fluid from pressure fluid plenum chamber 18' flows to valve bore grooves 86 and 94 through bore sections 72 and 82 and pressure fluid leaving valve ports 96 and 102 flows to clutches 136 and 150 via conduits 158 and 162 to bring about the actuation of said clutches to couple gear 132 to shaft 122 and gear 148 to shaft 126 whereby the power flow through the transmission 120 is through gears 132, 140, 152 and 148 and their related shafts.

While valve spool lands 62 and 64 block the flow of pressure fluid from the pressure fluid plenum chamber 18' into valve grooves 88 and 90, said grooves are placed in communication with the exhaust plenum chamber 20' through bore sections 76 and 78 whereby pressure fluid actuated clutches 134 and 144 are vented to exhaust and gears 130 and 142 are free to rotate on their respective shafts.

Referring to Fig. 6 of the drawings, valve spool 14' of valve 10' is shown to be moved further to the left so that ball detents 116 engage detent groove 108 of ball detent means 114. With the valve spool 14' positioned as shown in Fig. 6, pressure fluid from pressure fluid plenum chamber 18' flows to grooves 86 and 90 in the valve bore 56 and pressure fluid is directed by conduit means 156 and 162 to pressure fluid actuated clutch means 134 and 150, respectively. The lands on the valve spool 14' are also positioned so that valve groove 88 and valve groove 94 communicate with the exhaust fluid plenum chamber 20' whereby clutches 136 and 144 are open to exhaust and the drive through the transmission 120 is from the input shaft 122 to the second intermediate shaft 126 through gears 130, 138, 152 and 148.

Referring specifically to Fig. 7 of the drawings, the slidably mounted valve spool means 14' is shown positioned so that the detent balls 116 engage detent groove 106 in detent means 114 whereby pressure fluid from inlet plenum chamber 18' is directed to clutch 136 of input shaft 122 and clutch 144 of the second intermediate shaft 126, and clutch 134 of input shaft 122 and clutch 150 of the second intermediate shaft 126 are open to exhaust through exhaust plenum chamber 20'. Again, it will be seen that a pair of the valve bore grooves, namely, 88 and 94 are connected to pressure fluid in the pressure fluid plenum chamber 18' and the remainder of the valve bore grooves, namely, 86 and 90, are open to the exhaust fluid plenum chamber 20'.

The fifth position of the valve 10' is illustrated in Fig. 8 wherein valve spool 14' is positioned so that the detent balls 116 engage detent groove 104 in ball detent means 114. With the valve positioned as shown in Fig. 8, pressure fluid in pressure fluid plenum chamber 18' is in communication with valve bore grooves 88 and 90 whereby pressure fluid is directed via conduits 156 and 160 to pressure fluid actuated catch means 134 and 144, respectively. At the same time, clutches 136 and 150 are open to exhaust through exhaust plenum chamber 20' via valve bore grooves 94 and 86.

Valve spools 14 or 14' may be rapidly moved to any one of the valve spool settings described with reference to Figs. 4 through 8 at a high rate so that intermediate settings do not bring about actuation of their connected devices. The restrictor 25 in the pressure fluid inlet 24 acts to reduce the rate of flow of pressure fluid to the various motion devices without reducing the final pressure thereof and, therefore, aids in permitting movement of valve spool 14' from one setting to a remote setting without effecting actuation of the motion devices at intermediate settings.

From the foregoing description of various embodiments of the present invention, it will be seen that there is provided a pressure fluid control system which fully accomplishes each of the objects and advantages hereinabove set forth. While there has been shown and described several embodiments of the present invention, various changes and modifications may be made therein without departing from the spirit and the scope of the invention as defined in the appended claims. What we claim and desire to secure by Letters Patent is:

1. In a pressure fluid control system for a plurality of pressure fluid actuated motion devices including a control valve; pressure fluid conduit means conecting a source of pressure fluid with the control valve; exhaust conduit means connecting the control valve with sump means for the source of pressure fluid; and a line connecting each of the plurality of motion devices with the control valve; wherein said control valve includes a body portion having a bore therein; a groove in the valve body bore for each motion device communicating through a port in the valve body with the respective line for each motion device; a pressure fluid plenum chamber in the valve body communicating with the pressure fluid conduit means and with each of said valve body grooves; an exhaust fluid plenum chamber in the valve body communicating with the exhaust conduit means and with each of said valve body grooves; a single spool means slidable in the valve body bore; and spaced lands and grooves on the spool means cooperating with the grooves in the valve body bore for opening the flow of pressure fluid from the pressure fluid plenum chamber to a selected pair of grooves in the valve body bore while maintaining the flow of exhaust pressure fluid between other valve bore grooves and the exhaust plenum chamber.

2. In a pressure fluid control system for a plurality of pressure fluid actuated motion devices including a control valve; pressure fluid conduit means connecting a source of pressure fluid with the control valve; exhaust conduit means connecting the control valve with sump means for the source of pressure fluid; and a line connecting each of the plurality of motion devices with the control valve; wherein said control valve includes a body portion having a bore therein; a groove in the valve body bore for each motion device communicating through a port in the valve body with the respective line for each motion device; a pressure fluid plenum chamber in the valve body communicating with the pressure fluid conduit means and with each of said valve body grooves; an exhaust fluid plenum chamber in the valve body communicating with the exhaust conduit means and with each of said valve body grooves; a single spool means slidable in the valve body bore; and spaced lands and grooves on the spool means cooperating with the grooves in the valve body bore for opening the flow of pressure fluid from the pressure fluid plenum chamber to a selected pair of grooves in the valve body bore while maintaining the flow of exhaust pressure fluid between the other valve bore grooves and the exhaust plenum chamber and for selectively blocking the flow of pressure fluid from the pressure fluid plenum chamber to the valve body grooves and opening the flow of exhaust pressure fluid from the valve body grooves to the exhaust plenum chamber.

3. In a pressure fluid control system for four pressure fluid actuated motion devices including a control valve; pressure fluid conduit means connecting a source of pressure fluid with the control valve; exhaust conduit means connecting the control valve with sump means for the source of pressure fluid; and a line connecting each of the four motion devices with the control valve; wherein said control valve includes a body portion having a bore therein; four grooves in the valve body bore, one for each of the motion devices, communicating through a port in the valve body with the respective line for each of the motion devices; a pressure fluid plenum chamber in the valve body communicating with the pressure fluid conduit means and with each of said four valve body grooves; an exhaust fluid plenum chamber in the valve body communicating with the exhaust conduit means and with each of said four valve body grooves; a single spool means slidable in the valve body bore; and spaced lands and grooves on the spool means cooperating with the four grooves in the valve body bore for opening the flow of pressure fluid from the pressure fluid plenum chamber to a selected pair of the valve body grooves while continuing the flow of exhaust pressure fluid between other of the valve body grooves and the exhaust plenum chamber.

4. In a pressure fluid control system for four pressure fluid actuated motion devices including a control valve; pressure fluid conduit means connecting a source of pressure fluid from the control valve; exhaust conduit means connecting the control valve with sump means for the source of pressure fluid; and a line connecting each of the four motion devices with the control valve; wherein said control valve includes a body portion having a bore therein; four grooves in the valve body bore, one for each of the motion devices, communicating through a port in the valve body with the respective line for each of the motion devices; a pressure fluid plenum chamber in the valve body communicating with the pressure fluid conduit means and with each of said four valve body grooves; an exhaust fluid plenum chamber in the valve body communicating with the exhaust conduit means and with each of said four valve body grooves; a single spool means slidable in the valve body bore; and spaced lands and grooves on the spool means cooperating with the four grooves in the valve body bore for opening the flow of pressure fluid frm the pressure fluid plenum chamber to a selected pair of the valve body grooves while continuing the flow of exhaust pressure fluid between the other of the valve body grooves and the exhaust plenum chamber and for selectively blocking the flow of pressure fluid from the pressure fluid plenum chamber to the valve body grooves and opening the flow of exhaust pressure fluid from the valve body grooves to the exhaust plenum chamber.

References Cited in the file of this patent

UNITED STATES PATENTS

| | | |
|---|---|---|
| 2,400,237 | Kylin et al. | May 14, 1946 |
| 2,568,528 | Welte | Sept. 18, 1951 |
| 2,664,708 | Norelius et al. | Jan. 5, 1954 |
| 2,888,805 | Czarnocki | June 2, 1959 |